US007623137B1

(12) United States Patent
Miller

(10) Patent No.: US 7,623,137 B1
(45) Date of Patent: Nov. 24, 2009

(54) SUCCESSIVE-CONVOLUTION-COMPOSITING TECHNIQUE FOR RENDERING TRANSLUCENT SURFACES

(75) Inventor: Gavin S. P. Miller, Los Altos, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 483 days.

(21) Appl. No.: 11/355,041

(22) Filed: Feb. 15, 2006

(51) Int. Cl.
G09G 5/02 (2006.01)
G06T 15/50 (2006.01)
(52) U.S. Cl. .................. 345/592; 345/426; 345/629
(58) Field of Classification Search .............. 345/420, 345/421, 426, 629, 592
See application file for complete search history.

(56) References Cited

U.S. PATENT DOCUMENTS

| 5,867,166 | A | | 2/1999 | Myhrvold et al. | |
| 5,977,977 | A | * | 11/1999 | Kajiya et al. | 345/418 |
| 6,016,150 | A | * | 1/2000 | Lengyel et al. | 345/426 |
| 6,184,891 | B1 | * | 2/2001 | Blinn | 345/426 |
| 6,252,608 | B1 | * | 6/2001 | Snyder et al. | 345/473 |
| 7,030,887 | B2 | | 4/2006 | Andrews | |
| 2004/0150642 | A1 | * | 8/2004 | Borshukov et al. | 345/426 |

OTHER PUBLICATIONS

Real-Time Skin Rendering on Graphics Hardware, SIGGRAPH, ATI Research; 2005, p. 1.*
Publication entitled "A Model for Volume Lighting and Modeling", by Joe Kniss et al., IEEE Transactions on Visualization and Computer Graphics, vol. 9, Issue 2 (Apr. 2003) p. 150-162.
Shade, et al., "Layered Depth Images," Proceedings of the 25th Annual Conference on Computer Graphics and Interactive Techniques, 1998, pp. 231-242.
Guassian Smooth, http://web.archive.org/web/20040111061141/http://infocom.cheonan.ac.kr/~nykwak/kuim/gauss.html, Jan. 11, 2004.
Guassian Smooth, http://homepages.inf.ed.ac.uk/rbf/HIPR2/gsmooth.htm, 2003.
Gaussian Masks, Scale Space and Edge Detection, http://www.cogs.susz.ac.uk/users/davidy/teachvision/vision3.html, Jan. 1994.
Van den Boomgaard, et al., Gaussian Convolutions Numerical Approximations Based on Interpolation, Lecture Notes in Computer Science, 2001, pp. 205-214.
U.S. Appl. No. 11/355,029, filed Feb. 15, 2006.

* cited by examiner

*Primary Examiner*—M Good Johnson
(74) *Attorney, Agent, or Firm*—Robert C. Kowert; Meyertons, Hood, Kivlin, Kowert & Goetzel, P.C.

(57) ABSTRACT

One embodiment of the present invention provides a system that uses a successive-convolution technique to render a set of visible sprites which are visible through a translucent surface. During operation, the system first initializes a translucent light map to a background color. Next, the system iteratively processes each visible sprite, starting at a furthest visible sprite from the translucent surface, and iterating through successively nearer visible sprites until a nearest visible sprite is processed. While doing so, the system processes each visible sprite by first compositing the visible sprite into the translucent light map, and then incrementally blurring the resultant translucent light map.

21 Claims, 6 Drawing Sheets

SUCCESSIVE-CONVOLUTION-COMPOSITING TECHNIQUE FOR RENDERING TRANSLUCENT SURFACES

RELATED APPLICATION

The subject matter of this application is related to the subject matter in a co-pending non-provisional application by the same inventor as the instant application and filed on the same day as the instant application, entitled, "Successive-Convolution-Compositing Technique for Rendering Soft Shadows," having Ser. No. 11/355,029, and filing date Feb. 15, 2006.

BACKGROUND

1. Field of the Invention

The present invention relates to techniques for rendering graphical images of three-dimensional models. More specifically, the present invention relates to a successive-convolution-compositing technique for rendering soft shadows and/or translucent surfaces.

2. Related Art

Graphical scenes are often rendered using a "layered sprite model." A layered sprite model provides a scene description in which the objects are represented as "sprites," which are parallel planar surfaces with an associated depth position. For instance, such sprites can include rectangles aligned with the X, Y axes, with their depth position being a Z coordinate. Each of these planar surfaces may have a diffuse color image (or texture) as well as an "alpha texture," which determines coverage of each region of the planar surface. Sprites are usually rendered in back-to-front order, with the coverage value being used to blend between the underlying color and the sprite color.

A layered sprite model may be extended to include the illusion of light falling onto them by computing a "shadow texture" for each sprite. This shadow texture has a brightness that represents the amount of light reaching each region of the sprite, taking into account the sprites closer to the light source than the sprite itself. Note that the light source may be a parallel beam of light, called a "directional light," or a spotlight with a location and a direction-dependent intensity.

The shadow texture for a sprite may be computed in a number of ways. For shadowing sprites that have a coverage texture, it is important to take that coverage texture into account when working out how much light will reach another sprite (which is referred to as the "shadowed sprite").

A common technique for computing the shadow texture of a shadowed sprite proceeds as follows. First, the shadow texture for the shadowed sprite is set to 1.0 everywhere. Each shadowing sprite that is closer to the light source than the shadowed sprite is then transformed into the plane of the shadowed sprite using the light geometry. This transformed geometry is then used to "texture map" the coverage map of the shadowing sprite into the shadow map by multiplying the shadow map by 1.0 minus the coverage of the shadowing sprite. The result of this technique is a composite shadow map that may be used to modulate the brightness of the diffuse map on the shadowed sprite. (An alternative implementation considers the cast shadows to be sprites in their own right, performing the compositing in the final frame buffer. After each shadowed sprite is rendered, the shadow sprites are rendered over the top, darkening the contents of the frame-buffer directly.)

It is typical in the state of the art to filter or blur the coverage mask of the shadowing sprite before compositing it into the shadowed sprite's shadow map. This approximates the appearance of an area light source casting light onto the scene. However, this technique is only accurate for a scene with two layers and a single shadowing sprite. For example, if two shadowing sprites at the same depth cast shadows onto a shadowed sprite, in order to be optically accurate, it is necessary to merge both coverage masks together and then blur the result, rather than compositing them independently. In an alternative technique in the state of the art, all of the coverage masks are composited into the shadow map, and the result in blurred. This will only be accurate when all of the shadowing sprites are at the same distance from the shadowed sprite.

This can be seen as necessary by considering two rectangular shadowing sprites that touch along one edge. In order to be physically accurate, no light should pass through that edge onto the shadowed sprite. However, if the coverage of each shadowing sprite is blurred and composited independently, a crack will appear in the shadow along the edge where they touch. This is because convolution is an approximation to the proper optical computation of soft shadows.

A more-accurate approach to computing soft shadows is to consider each point on the shadowed sprite and to compute directly how much light would be occluded by the shadowing sprites. This approach considers a large number of rays starting at different points on the light source and computes the amount of light reaching the shadowed surface. This approach provides an accurate estimate of the illumination (given sufficiently many rays), but can be computationally prohibitive. The averaging of the rays is done after the occlusions have been combined for each ray independently, and the absence of a crack is correctly determined by the fact that rays will hit the geometry for each shadowing sprite.

In contrast to this computationally-intensive technique, the previously-described technique that convolves the coverage mask of the shadowing sprite before compositing it is only an approximation. However, many user interfaces and graphic designs use just two layers, so this convolution-based technique is widely used.

Hence, what is needed is a method and an apparatus that provides a computationally-efficient technique for computing the soft shadows that result from multiple shadowing sprites (at equal or unequal depths).

SUMMARY

One embodiment of the present invention provides a system that uses a successive-convolution technique to render shadows produced by a set of shadowing sprites onto a shadowed sprite. During operation, the system initializes a shadow map. Next, the system iteratively processes each shadowing sprite, starting at a furthest shadowing sprite from the shadowed sprite, and iterating through successively nearer shadowing sprites, until a nearest shadowing sprite is processed. In doing so, the system processes each shadowing sprite by first transforming the shadowing sprite's coverage map to the parametric space of the shadowed sprite. Next, the system composites the transformed shadowing sprite into the shadow map, and then incrementally blurs the resultant shadow map.

In a variation on this embodiment, transforming the shadowing sprite's coverage map to the parametric space of the shadowed sprite involves shifting the shadowing sprite's coverage map based on light direction and the Z-distance between the shadowing sprite and the shadowed sprite.

In a variation on this embodiment, incrementally blurring the resultant shadow map involves performing a Gaussian convolution on the resultant shadow map.

In a further variation, performing the Gaussian convolution involves performing an incremental convolution which is functionally related to the distance between shadowing sprite and the next-nearest shadowing sprite (based on the fact that Gaussian convolution widths add in quadrature). In this way, the successive incremental convolutions applied to the shadow map for nearer shadowing sprites result in a composite blur width for the shadowing sprite which is consistent with the total Z-distance between the shadowing sprite and the shadowed sprite.

In a variation on this embodiment, after the iterative process is complete, the system uses the resultant shadow map as a shadow texture while rendering the shadowed sprite.

In a further variation, the system renders shadows for each layer in a scene, except for a nearest layer.

In a variation on this embodiment, a given sprite comprises a planar surface which is orthogonal to the Z-axis. Additionally, the given sprite has: a Z-coordinate; a diffuse color texture for the planar surface; and a coverage map which determines coverage of the planar surface.

One embodiment of the present invention provides a system that uses a successive-convolution technique to render a set of visible sprites which are visible through a translucent surface. During operation, the system first initializes a translucent light map to a background color. Next, the system iteratively processes each visible sprite, starting at a furthest visible sprite from the translucent surface, and iterating through successively nearer visible sprites until a nearest visible sprite is processed. While doing so, the system processes each visible sprite by first compositing the visible sprite into the translucent light map, and then incrementally blurring the resultant translucent light map.

In a variation on this embodiment, incrementally blurring the resultant translucent light map involves performing a Gaussian convolution on the resultant translucent light map.

In a further variation, performing the Gaussian convolution involves performing an incremental convolution which is functionally related to the distance between the visible sprite and the next-nearest visible sprite (based on the fact that Gaussian convolution widths add in quadrature), whereby the successive incremental convolutions applied to the translucent light map for nearer visible sprites result in a composite blur width for the visible sprite which is consistent with the total Z-distance between the visible sprite and the translucent surface.

In a variation on this embodiment, after the iterative process is complete, the system uses the resultant translucent light map as a texture while rendering the translucent surface.

In a variation on this embodiment, if a given visible sprite is translucent and therefore comprises a "second translucent surface," the system computes a "composite scattering coefficient" to blur sprites that are visible through both the original translucent surface and the second translucent surface. This composite scattering coefficient is computed based on the fact that the scattering caused by the original translucent surface and the second translucent surface are added together in quadrature.

In another variation on this embodiment, if a given visible sprite is translucent and therefore comprises a "second translucent surface," the system first computes a direct-view translucent light map for visible sprites that are visible through the second translucent surface. Next, the system uses the direct-view translucent light map as a texture for the second translucent surface while rendering the second translucent surface as seen through the original translucent surface.

DETAILED DESCRIPTION

Figure 1:
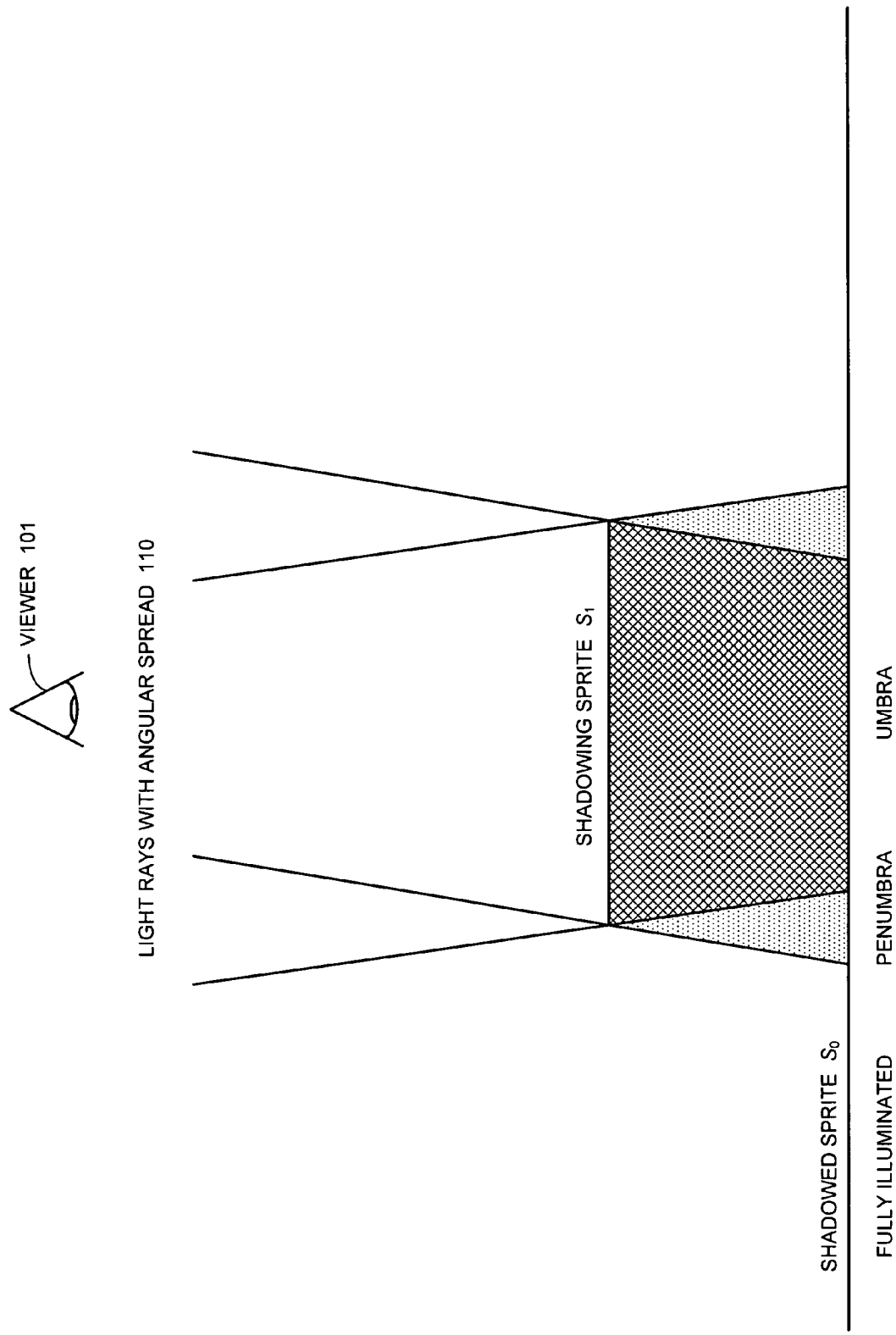
FIG. 1 illustrates shadows cast by a sprite in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

This specification describes a new technique invention that facilitates realistic-looking translucency, and soft shadows for axis-aligned sprites. One intended use of such effects is for layered-document models (such as a document with overlays) and in layered user interfaces. Other applications might include animation systems, multi-media players and games.

Successive-Convolution Compositing Technique for Soft Shadows

One embodiment of the present invention uses a successive-convolution-compositing technique to produce soft shadows. This embodiment operates as follows. The system starts with a set of "shadowing sprites," which cast the shadows, and an "shadowed sprite" upon which the shadows are cast. Note that a sprite comprises a planar surface which is orthogonal to the Z-axis. Moreover, a sprite has Z-coordinate and a coverage map which determines coverage of the planar surface. A sprite can also have a diffuse color texture for the planar surface. (For the purposes of the present invention, the planar surfaces are assumed to be orthogonal to the Z-axis, but can include rotations about the Z-axis).

During the successive-convolution-compositing technique, the system first initializes a temporary working buffer, which is referred to as a "shadow map." For example, this may involve setting each value in the shadow map to a value of 1.0. Next, the system starts at furthest shadowing sprite from the shadowed sprite and iterates to nearest shadowing sprite. During this process, each shadowing sprite's coverage map is transformed to the shadowed sprite's texture space and is then composited into the shadow map. The compositing is accomplished by multiplying the existing shadow map by 1 minus the coverage value from the shadowing sprite. The resultant shadow map is then "incrementally" blurred using a convolution filter. The iterations continue until no more shadowing sprites remain.

Unlike existing techniques which convolve the coverage map for a shadowing sprite during each iteration, in the present invention the entire shadow map is incrementally convolved at each iteration.

In order to perform this "incremental convolution," it is useful to first determine how much to filter the entire shadow map each time a new sprite is composited. Referring the FIG. 1, we assume for an area light source that the blurring of the shadow of a shadowing sprite should be proportional to the Z-distance from the shadowing sprite to the shadowed sprite. (This will be exactly true for an axis-aligned planar light source which subtends a finite angle and is at infinity; this is known as a "directional area light.")

If we also assume that the blurring of the shadow may be computed using a Gaussian convolution, then the width of the Gaussian should ideally be proportional to the distance between the shadowing sprite and the shadowed sprite. This is simple to apply to a single shadowing sprite, because the coverage map can simply be composited into the shadow map and the resulting shadow map can be convolved using a Gaussian convolution.

Figure 2:
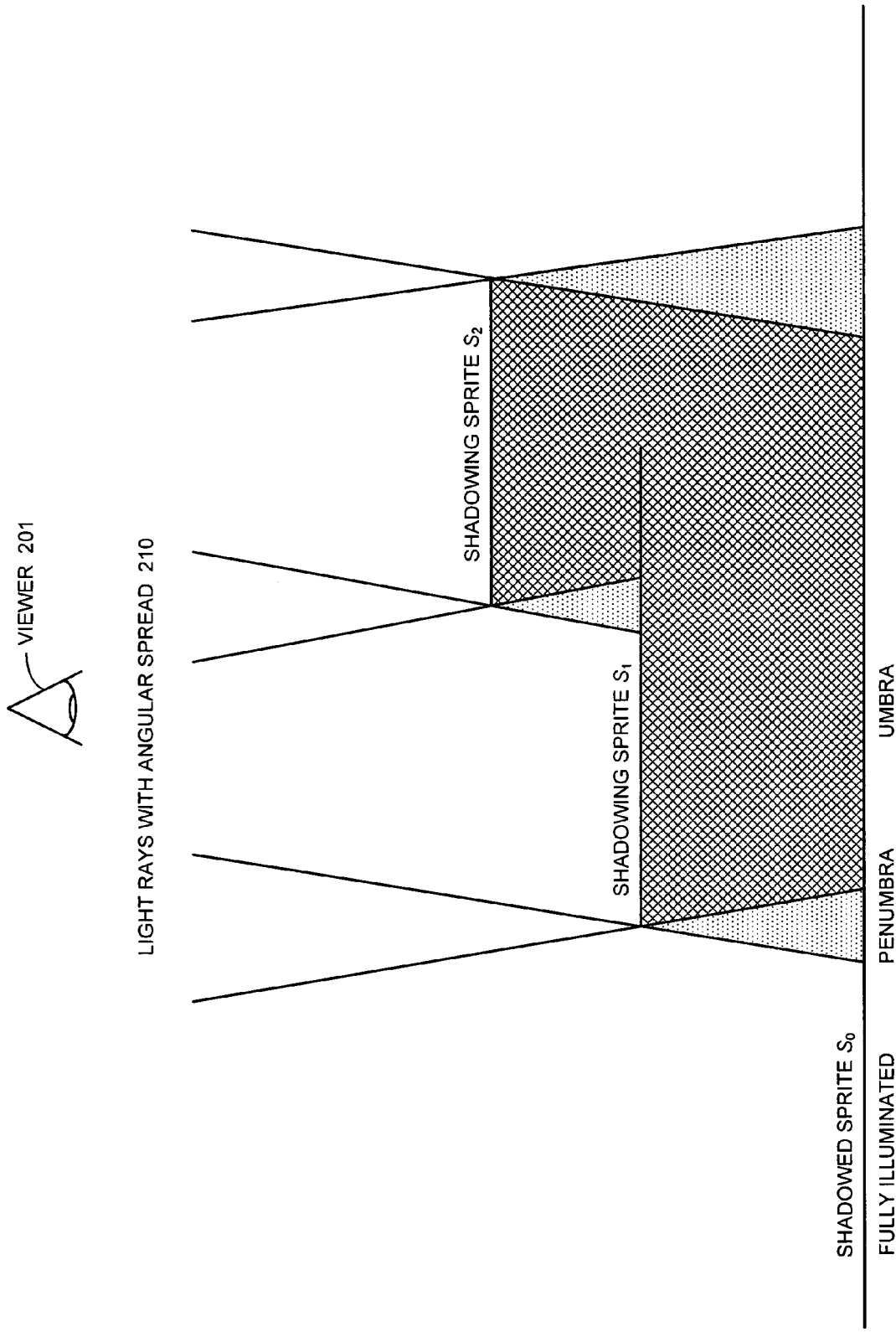
FIG. 2 illustrates shadows cast by two sprites that are close together in accordance with an embodiment of the present invention.

However, it is not so simple to do so for multiple shadowing sprites. FIG. 2 illustrates the case of two shadowing sprites, $S_1$ and $S_2$, which cast shadows on a shadowed sprite $S_0$. In this case, $S_1$ is closer to the shadowed sprite than $S_2$.

We first compute the Gaussian convolution of the coverage map from $S_1$ using the formula $$C_1 = a(Z_1 - Z_0),$$

where $C_1$ is the convolution width after compositing $S_1$, where $Z_1$, $Z_0$ are the depths of $S_1$ and $S_0$, and where a is the coefficient that controls the angular spread of the light source (which will linearly scale the softness of the shadows).

The desired shadow blur for $S_2$ uses a similar equation, $$C_2 = a(Z_2 - Z_0).$$

However, if we use this value directly, we will over-blur shadows from $S_2$ because the shadow map will also be blurred by $C_1$ later in the process. What we need is to compute a blur width $B_2$ that will combine with $C_1$ to give a composite blur of $C_2$.

Fortunately, it is a well-known property of Gaussian convolution that the convolution of two Gaussians is another Gaussian. Moreover, the Gaussian widths add in quadrature $$G_2^2 = G_0^2 + G_1^2,$$

where $G_2$ is the equivalent single Gaussian convolution width of two successive Gaussian convolutions $G_0$ and $G_1$.

So we may compute $B_2$ from $$B_2 = (C_2^2 - C_1^2)^{0.5}.$$

For $S_i$ we can compute the post-compositing convolution size from $$B_i = (C_i^2 - C_{i-1}^2)^{0.5}.$$

Note that for the trivial case where $B_i$ is zero, no convolution is required. This will occur when two shadowing sprites have the same depth value. This avoids the cracks that occur in the naïve convolution technique described previously. This new technique is also nicely behaved if any or all of the sprites are smoothly animated in depth.

Translucency

For the purposes of this specification, transparency and translucency are defined in the following manner. A "transparent surface" is one which allows light to pass through it in a straight line. The light may be partially attenuated by a factor, which is called the "transparency coefficient." An ideal transparent surface may be thought of as a piece of infinitely thin tinted glass (with no reflections). The amount of tinting controls the transparency coefficient.

Transparency may be incorporated into a coverage map. In this case the coverage (i.e., fractional area covered by the sprite) may be multiplied by 1 minus the transparency to compute a composite "alpha" value. This is often done for sprite-based systems.

A "translucent surface" is one which scatters light as it passes through it over some angular distribution. The angular spread of the scattered light is determined by a phase function. An ideal translucent surface may be thought of as a piece of infinitely thin frosted glass (with no reflections). The amount of frosting (or roughness of the surface) controls the phase function.

In terms of a set of axis-aligned sprites, transparency may be incorporated into the coverage map. In that case, the coverage (i.e. fractional area covered by the sprite) may be multiplied by 1 minus the transparency to compute a composite alpha. This is often done for sprite-based systems.

Figure 3:
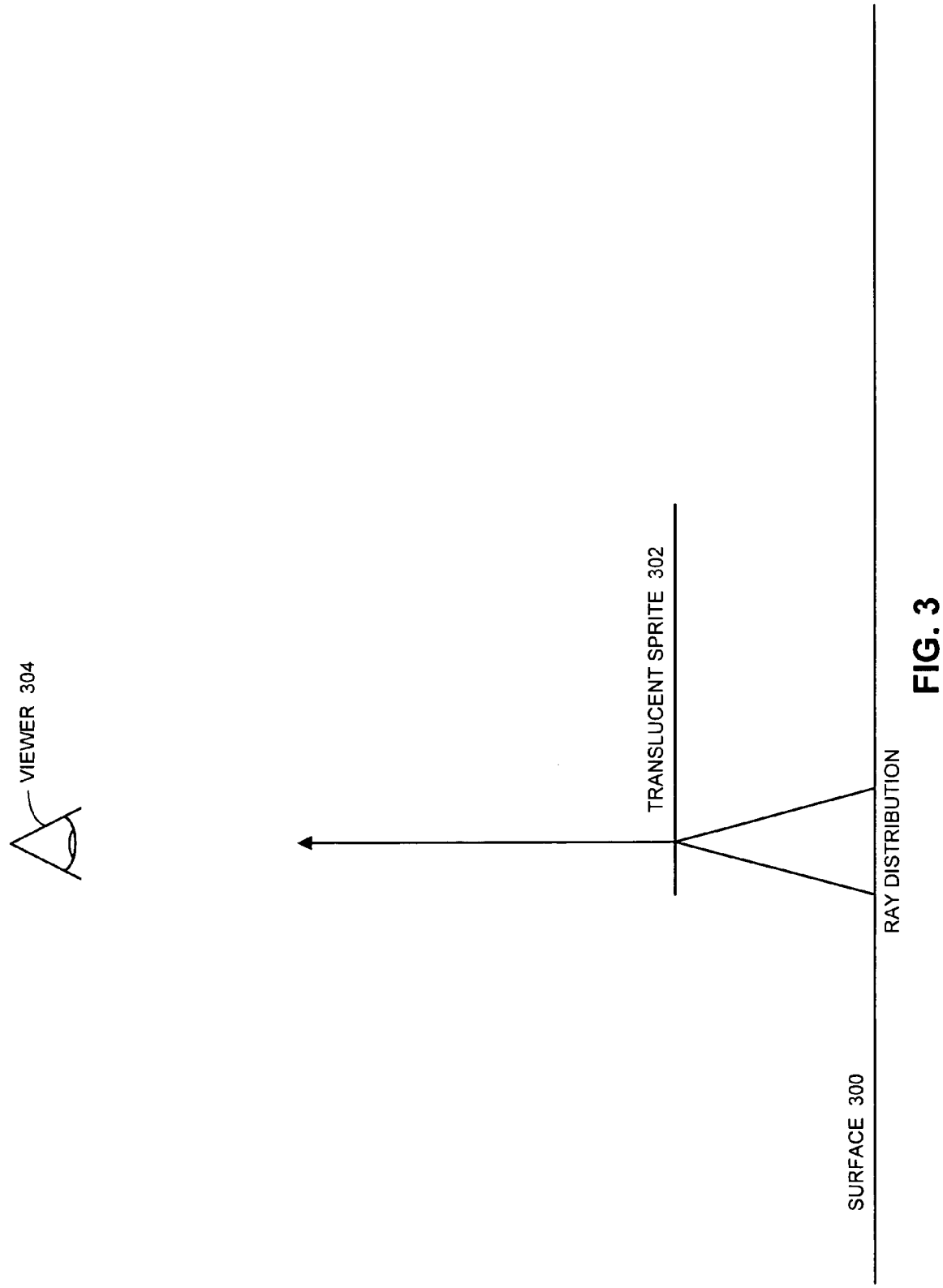
FIG. 3 illustrates how light is received through a translucent surface in accordance with an embodiment of the present invention.

Translucency, on the other hand, is more complex. A renderer needs to take into account the lateral deflection of the light rays and their distribution. FIG. 3 illustrates the rays being deflected by a translucent sprite 302. For now, all of the other sprites are considered to be opaque with coverage maps.

Traditional techniques for rendering translucent surfaces use one of the following two techniques.

Ray Tracing Technique—During the ray-tracing technique, rays are deflected by the surface using a phase function to create a distribution of rays. The weighted-average color of the resultant rays is used to compute the appearance of the translucent surface. This technique is very computationally expensive.

Accumulation-Buffer Technique—During the accumulation-buffer technique, the scene is rendered multiple times through multiple passes, with each pass having a different amount of shear about the plane of the translucent surface. During this process, each rendered image is added into an accumulation buffer and the resultant average image gives the appearance of translucency.

A Layered Sprite Translucency Model

For the special case of a layered sprite model (as outlined previously), it is possible to use convolution to approximate the appearance of a translucent surface. During this process, the scene is rendered back-to-front, and the underlying image behind the translucent surface is blurred using a convolution filter. As with the previously-discussed shadowing techniques, this convolution approach has some limitations. If only one other surface 300 is visible through the translucent sprite 302, as in FIG. 3, then the convolution approach is acceptably accurate. However, the amount of blurring of the background sprite should be proportional to the distance between the translucent surface and the surface underneath, $$C_i = k(Z_i - Z_0),$$

where k is a scattering coefficient for the translucent surface.

For a layered-sprite model involving several sprites at different depths another approach is required. A straight-forward approach is to convolve each visible sprite by a convolution whose size is proportional to the difference in depth between the translucent sprite and the visible sprite. During this process, a "translucent light" map is first initialized to the background color and then each visible sprite is blurred and then composited into the translucent light map in back-to-front order.

This naïve translucent compositing technique suffers from similar problems to the naïve soft shadow technique. Sprites that share an edge will allow light through from objects behind them since they are blurred and then composited. An improvement to the accuracy of translucent compositing can also be achieved by using successive-convolution compositing.

Once again, the translucent light map is initialized with the background color. It is then composited with the rear-most sprite $S_n$. The resultant translucent light map is then blurred using a Gaussian convolution with size $B_n$. The next most rearward sprite $S_{n-1}$ is then composited over the translucent light map and convolved using a Gaussian convolution $B_{n-1}$.

Once again, $$B_i = (C_i^2 - C_{i-1}^2)^{0.5}.$$

Layering Translucent Sprites with Each Other

When rendering multiple translucent sprites, it is possible to have one translucent sprite visible through another. If this is the case, it is most efficient just to use the direct-view translucency map when rendering one translucent sprite into the translucency map of another. However, this is only an approximation of correct optics.

Consider a sprite $S_1$ with a scattering coefficient $k_1$, and a second sprite $S_2$ which is visible through $S_1$. The scattering coefficient for $S_2$ is $k_2$. However, consider that $k_2$ has a value of zero, and that $S_2$ is perfectly non-scattering or transparent. If the two sprites were almost co-planar, the blurring due to $S_1$ would be almost zero since a very small blur coefficient would be applied to the image of $S_2$ given the small depth difference between the two sprites.

To be more accurate, the scattering due to both $S_2$ and $S_1$ need to be added together in quadrature and applied to the computation of the translucency map for $S_2$. If we consider $k_{2 \to 1}$ to be the scattering coefficient of $S_2$ when viewed through $S_1$, then $$k_{2 \to 1} = (k_1^2 - k_2^2)^{0.5}.$$

However, this requires a different translucency map to be computed for each sprite-sprite pair. For that reason, in many situations it may be preferable to use the direct-view translucency map for secondary translucency paths despite the inaccuracies.

CONCLUSIONS AND OPTIMIZATIONS

Embodiments of the present invention help to support a consistent graphical display of sprites when the sprites have their depth values animated smoothly from one value to another. Previous convolution-based approaches for shadow blurring and translucency do not behave as consistently when doing such animations. The use of this technique for translucent surfaces also produces correct optical behavior as the depths of sprites are animated continuously. Existing user interfaces may have had a depth order, but not a smoothly animated depth value. These transitions may prove important for user interfaces and multi-media presentations.

One way to optimize the shadow convolution computation is to detect regions of constant brightness in the shadow maps. These regions can be used to determine areas in which a full convolution is not required since the result may be trivially set to the constant color.

Generating a Shadow Map

Figure 4:
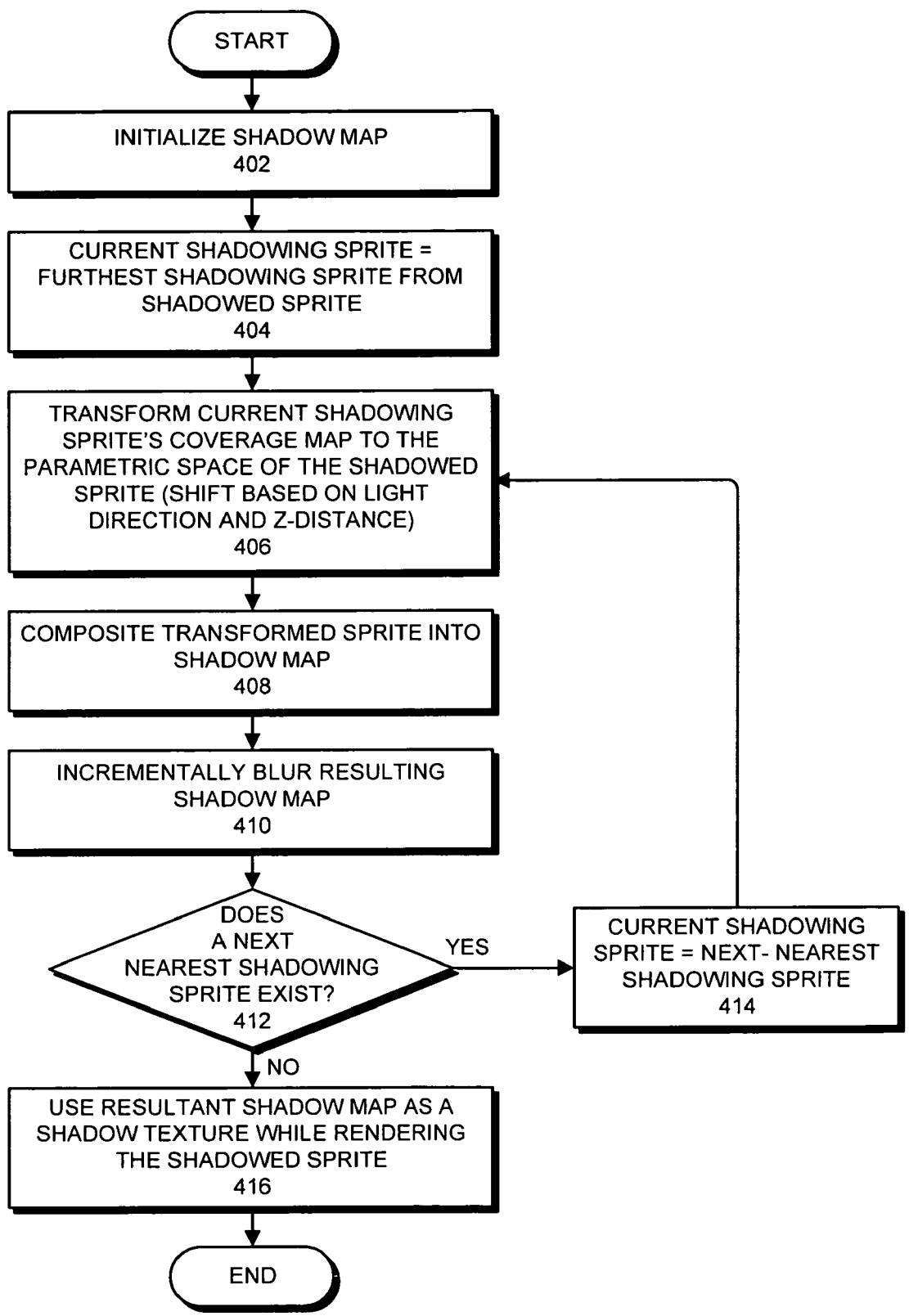
FIG. 4 presents a flow chart illustrating how a shadow map is generated in accordance with an embodiment of the present invention.

FIG. 4 presents a flow chart illustrating how a shadow map is generated and used in accordance with an embodiment of the present invention. First, the system initializes the shadow map, for example to a value such as 1.0 (step 402). Next, the system sets the current shadowing sprite to be the furthest shadowing sprite from the shadowed sprite (step 404).

The system then iteratively processes the shadowing sprites. More specifically, the system transforms the current shadowing sprite's coverage map into the parametric space of the shadowed sprite (step 406). Note that this can involve shifting the coverage map based on light direction and the Z-distance between the current shadowing sprite and the shadowed sprite. Next, the system composites the transformed shadowing sprite into the shadow map (step 408). The system then incrementally blurs the resulting shadow map (step 410). The system then determines if a next-nearest shadowing sprite exists (step 412). If so, the system sets the current shadowing sprite to be the next-nearest shadowing sprite (step 414) and returns to step 406 to repeat the process.

Otherwise, if no nearer shadowing sprites remain, the iterative process is complete, and the system uses the resultant shadow map as a shadow texture while rendering the shadowed sprite (step 416). Note that this entire process is repeated for each possible shadowed sprite.

Generating a Translucent Light Map

Figure 5:
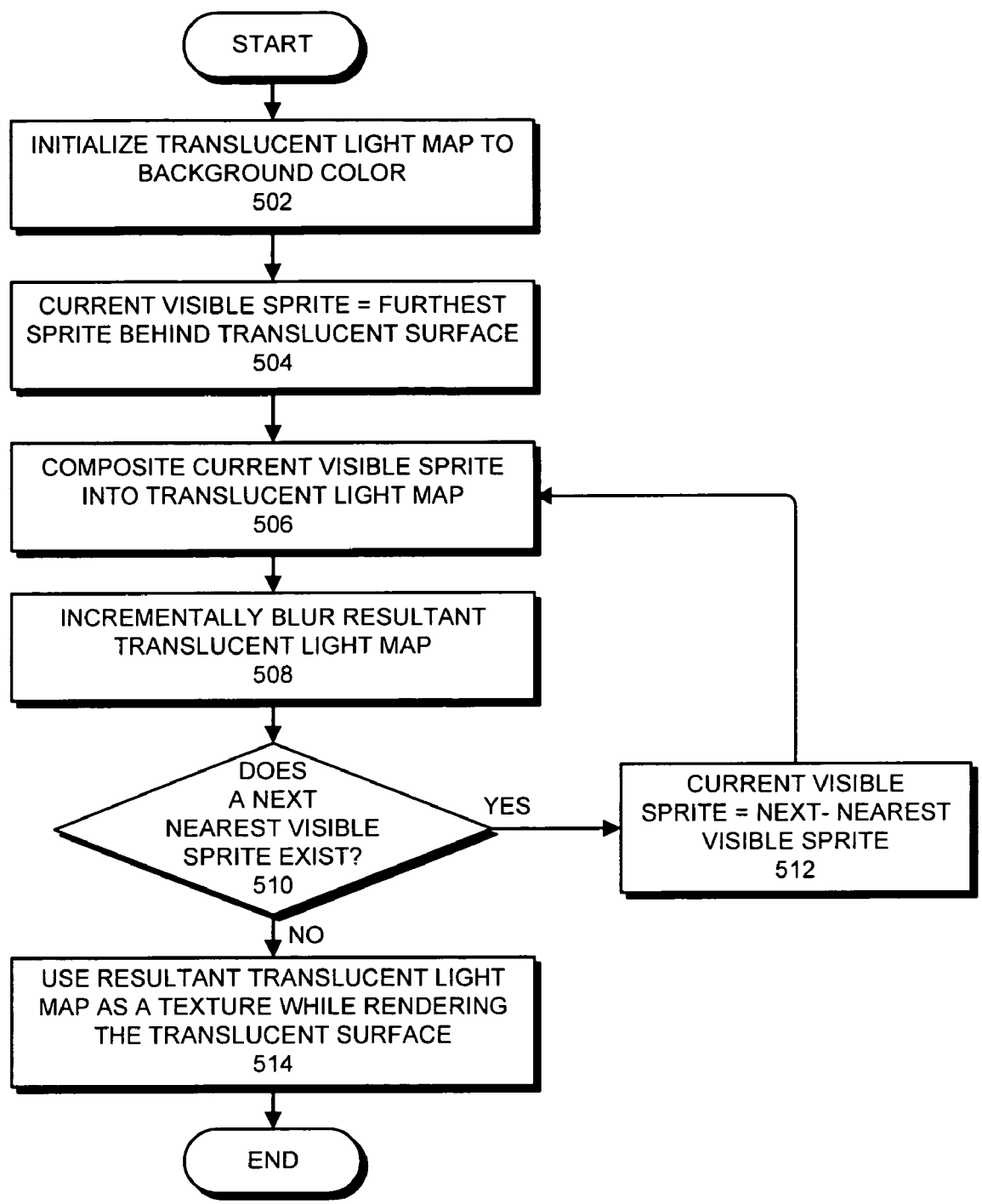
FIG. 5 presents a flow chart illustrating how a translucent light map is generated in accordance with an embodiment of the present invention.

FIG. 5 presents a flow chart illustrating how a translucent light map is generated and used in accordance with an embodiment of the present invention. The process starts with a translucent surface and a set of "visible sprites" which are visible through the translucent surface.

First, the system initializes a translucent light map, for example by setting it to a background color (step 502). Next, the system sets the current visible sprite to be the furthest sprite behind the translucent surface (step 504).

The system then iteratively processes the visible sprites. During this process, the system composites the current visible sprite into the translucent light map (step 506). The system then incrementally blurs the resulting translucent light map as described above (step 508). Next, the system determines if a next-nearest visible sprite exists (step 510). If so, the system sets the current visible sprite to be the next-nearest visible sprite (step 512) and returns to step 506 to repeat the process.

Otherwise, if no nearer visible sprites remain, the iterative process is complete, and the system uses the resultant translucent light map as a texture while rendering the translucent surface (step 514). Note that this entire process is repeated for each translucent surface in the scene.

Computer System

Figure 6:
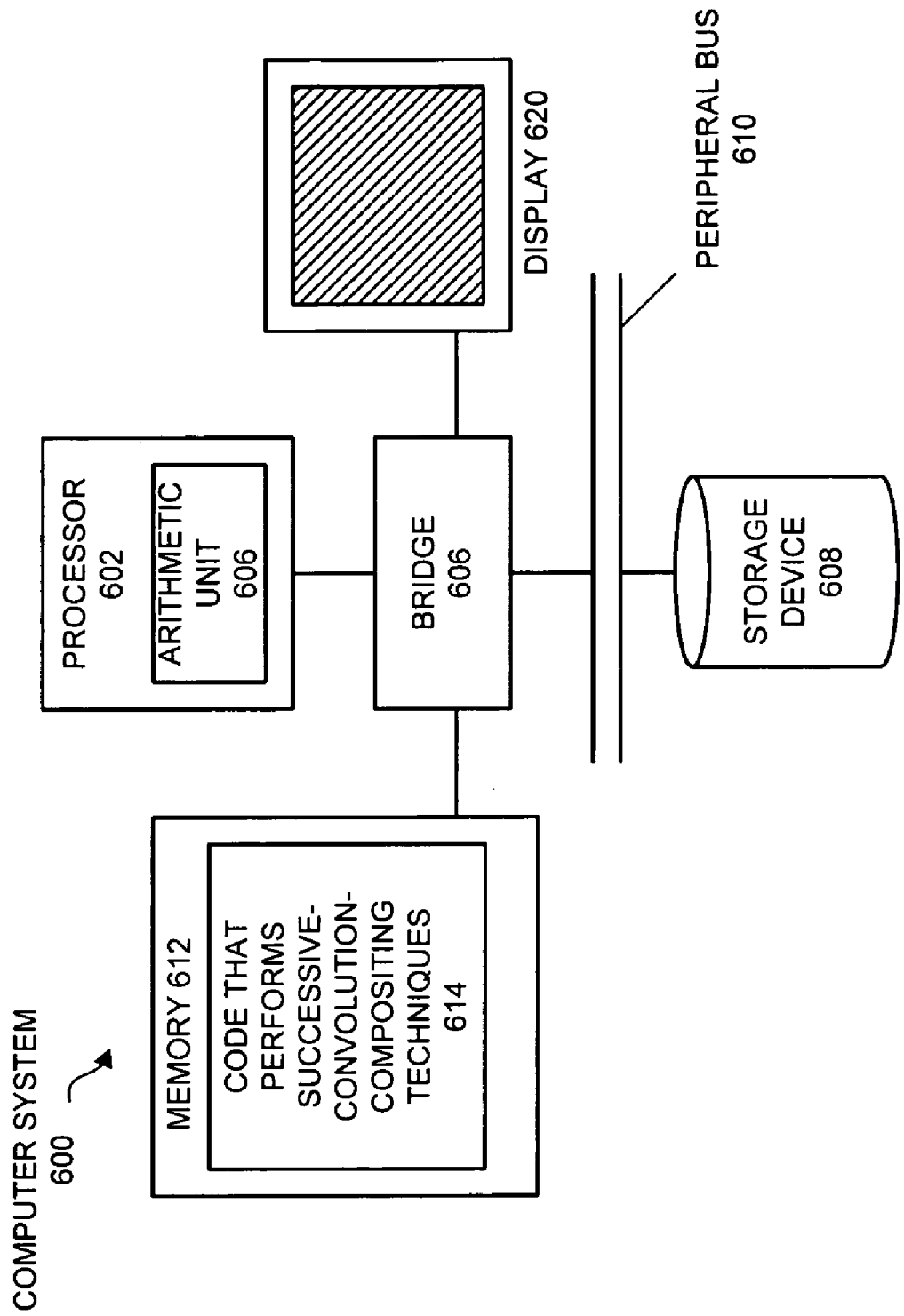
FIG. 6 illustrates a computer system in accordance with an embodiment of the present invention.

FIG. 6 illustrates a computer system 600 in accordance with an embodiment of the present invention. As illustrated in FIG. 6, computer system 600 includes processor 602, which is coupled to a memory 612, a display 620 and a peripheral bus 610 through bridge 606. Bridge 606 can generally include any type of circuitry for coupling components of computer system 600 together.

Processor 602 can include any type of processor, including, but not limited to, a microprocessor, a mainframe computer, a digital signal processor, a personal organizer, a device controller and a computational engine within an appliance. Processor 602 includes an arithmetic unit 604, which is capable of performing computational operations.

Processor 602 communicates with storage device 608 through bridge 606 and peripheral bus 610. Storage device 608 can include any type of non-volatile storage device that can be coupled to a computer system. This includes, but is not limited to, magnetic, optical, and magneto-optical storage devices, as well as storage devices based on flash memory and/or battery-backed up memory.

Processor 602 communicates with display 620 through bridge 606. Display 620 can include any type of computer system display that can be used to present a user interface that implements folded scrolling.

Processor 602 communicates with memory 612 through bridge 606. Memory 612 can include any type of memory that can store code and data for execution by processor 602. As illustrated in FIG. 6, memory 612 contains code that performs successive-convolution-compositing techniques 614.

Note that although the present invention is described in the context of computer system 600 illustrated in FIG. 6, the present invention can generally operate on any type of computing device. Hence, the present invention is not limited to the computer system 600 illustrated in FIG. 6.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for using a successive-convolution technique to render a set of visible sprites which are visible through a translucent surface, comprising:
using a computer to perform:
initializing a translucent light map to a background color; and
iteratively processing each visible sprite starting at a furthest visible sprite from the translucent surface and iterating through successively nearer visible sprites until a nearest visible sprite is processed, wherein processing each visible sprite involves:
compositing the visible sprite into the translucent light map; and
incrementally blurring the resultant translucent light map, wherein incrementally blurring the resultant translucent light map comprises performing an incremental convolution which is functionally related to the distance between the visible sprite and the next-nearest visible sprite.

2. The method of claim 1, wherein performing the incremental convolution involves performing a Gaussian convolution on the resultant translucent light map.

3. The method of claim 2, wherein performing the Gaussian convolution involves performing the incremental convolution based on a property that Gaussian convolution widths add in quadrature, wherein the successive incremental convolutions applied to the translucent light map for nearer visible sprites result in a composite blur width for the visible sprite which is consistent with the total Z-distance between the visible sprite and the translucent surface.

4. The method of claim 1, wherein after the iterative process is complete, the method further comprises using the resultant translucent light map as a texture while rendering the translucent surface.

5. The method of claim 1, wherein if a given visible sprite is translucent and comprises a second translucent surface, the method further comprises computing a "composite scattering coefficient" to blur sprites that are visible through both the original translucent surface and the second translucent surface, wherein the composite scattering coefficient is computed based on a property that scattering caused by the original translucent surface and scattering caused by the second translucent surface are added together in quadrature.

6. The method of claim 1, wherein if a given visible sprite is translucent and comprises a second translucent surface, the method further comprises:
computing a direct-view translucent light map for visible sprites that are visible through the second translucent surface; and
using the direct-view translucent light map as a texture for the second translucent surface while rendering the second translucent surface as seen through the original translucent surface.

7. The method of claim 1, wherein a given sprite comprises a planar surface which is orthogonal to the Z-axis, and wherein the given sprite has:
a Z-coordinate;
a diffuse color texture for the planar surface; and
a coverage map which determines coverage of the planar surface.

8. A computer-readable storage medium storing instructions that when executed by a computer cause the computer to perform a method for using a successive-convolution technique to render a set of visible sprites which are visible through a translucent surface, the method comprising:
initializing a translucent light map to a background color; and
iteratively processing each visible sprite starting at a furthest visible sprite from the translucent surface and iterating through successively nearer visible sprites until a nearest visible sprite is processed, wherein processing each visible sprite involves:
compositing the visible sprite into the translucent light map; and
incrementally blurring the resultant translucent light map, wherein incrementally blurring the resultant translucent light map comprises performing an incremental convolution which is functionally related to the distance between the visible sprite and the next-nearest visible sprite.

9. The computer-readable storage medium of claim 8, wherein performing the incremental convolution involves performing a Gaussian convolution on the resultant translucent light map.

10. The computer-readable storage medium of claim 9, wherein performing the Gaussian convolution involves performing the incremental convolution based on a property that Gaussian convolution widths add in quadrature, wherein the successive incremental convolutions applied to the translucent light map for nearer visible sprites result in a composite blur width for the visible sprite which is consistent with the total Z-distance between the visible sprite and the translucent surface.

11. The computer-readable storage medium of claim 8, wherein after the iterative process is complete, the method further comprises using the resultant translucent light map as a texture while rendering the translucent surface.

12. The computer-readable storage medium of claim 8, wherein if a given visible sprite is translucent and comprises a second translucent surface, the method further comprises computing a "composite scattering coefficient" to blur sprites that are visible through both the original translucent surface and the second translucent surface, wherein the composite scattering coefficient is computed based on a property that scattering caused by the original translucent surface and scattering caused by the second translucent surface are added together in quadrature.

13. The computer-readable storage medium of claim 8, wherein if a given visible sprite is translucent and comprises a second translucent surface, the method further comprises:
    computing a direct-view translucent light map for visible sprites that are visible through the second translucent surface; and
    using the direct-view translucent light map as a texture for the second translucent surface while rendering the second translucent surface as seen through the original translucent surface.

14. The computer-readable storage medium of claim 8, wherein a given sprite comprises a planar surface which is orthogonal to the Z-axis, and wherein the given sprite has:
    a Z-coordinate;
    a diffuse color texture for the planar surface; and
    a coverage map which determines coverage of the planar surface.

15. An apparatus that uses a successive-convolution technique to render a set of visible sprites which are visible through a translucent surface, the apparatus comprising at least one processor and a memory, wherein the memory stores program instructions executable by the at least one processor to implement:
    an initialization mechanism configured to initialize a translucent light map to a background color; and
    a processing mechanism configured to iteratively process each visible sprite starting at a furthest visible sprite from the translucent surface and iterating through successively nearer visible sprites until a nearest visible sprite is processed, wherein while processing each visible sprite, the processing mechanism is configured to:
        composite the visible sprite into the translucent light map; and
        incrementally blur the resultant translucent light map, wherein incrementally blurring the resultant translucent light map comprises performing an incremental convolution which is functionally related to the distance between the visible sprite and the next-nearest visible sprite.

16. The apparatus of claim 15, wherein while performing the incremental convolution, the processing mechanism is configured to perform a Gaussian convolution on the resultant translucent light map.

17. The apparatus of claim 16, wherein while performing the Gaussian convolution, the processing mechanism is configured to perform the incremental convolution based on a property that Gaussian convolution widths add in quadrature, wherein the successive incremental convolutions applied to the translucent light map for nearer visible sprites result in a composite blur width for the visible sprite which is consistent with the total Z-distance between the visible sprite and the translucent surface.

18. The apparatus of claim 15, further comprising a rendering mechanism, wherein after the iterative process is complete, the rendering mechanism is configured to use the resultant translucent light map as a texture while rendering the translucent surface.

19. The apparatus of claim 15, wherein if a given visible sprite is translucent and comprises a second translucent surface, the processing mechanism is configured to compute a "composite scattering coefficient" to blur sprites that are visible through both the original translucent surface and the second translucent surface, wherein the composite scattering coefficient is computed based on a property that scattering caused by the original translucent surface and scattering caused by the second translucent surface are added together in quadrature.

20. The apparatus of claim 15, wherein if a given visible sprite is translucent and comprises a second translucent surface, the processing mechanism is configured to:
    compute a direct-view translucent light map for visible sprites that are visible through the second translucent surface; and
    use the direct-view translucent light map as a texture for the second translucent surface while rendering the second translucent surface as seen through the original translucent surface.

21. The apparatus of claim 15, wherein a given sprite comprises a planar surface which is orthogonal to the Z-axis, and wherein the given sprite has:
    a Z-coordinate;
    a diffuse color texture for the planar surface; and
    a coverage map which determines coverage of the planar surface.

* * * * *

UNITED STATES PATENT AND TRADEMARK OFFICE
CERTIFICATE OF CORRECTION

PATENT NO.        : 7,623,137 B1
APPLICATION NO. : 11/355041
DATED             : November 24, 2009
INVENTOR(S)       : Gavin S. P. Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Twenty-sixth Day of October, 2010

David J. Kappos
*Director of the United States Patent and Trademark Office*